(12) United States Patent
Chang

(10) Patent No.: US 6,304,648 B1
(45) Date of Patent: Oct. 16, 2001

(54) MULTIMEDIA CONFERENCE CALL PARTICIPANT IDENTIFICATION SYSTEM AND METHOD

(75) Inventor: Young-Fu Chang, Buffalo Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/217,503

(22) Filed: Dec. 21, 1998

(51) Int. Cl.$^7$ ..................................................... H04M 3/42
(52) U.S. Cl. ............................... 379/202.01; 379/204.01; 348/15
(58) Field of Search .................................. 379/202, 93.21, 379/204, 205, 206; 348/15, 14, 16, 17, 18, 19

(56) References Cited

U.S. PATENT DOCUMENTS 5,710,591  *  1/1998  Bruno et al. ....................... 379/202 X
5,936,662  *  8/1999  Kim et al. ....................... 379/93.21 X
6,020,915  *  2/2000  Bruno et al. .......................... 379/202

* cited by examiner

*Primary Examiner*—Creighton Smith

(57) ABSTRACT

A telecommunication system for establishing a conference call between various participants to the call communicating via multimedia communication devices. A call participant identification system detects the presence of voice signals made from a speaking call participant during the conference call. Call participant identification information is associated with the voice signals generated by the speaking call participant. A visual indication identifying the call participant is established at other multimedia communication devices connected with the call to identify the speaking call participant to the other participants of the conference call upon the detection of the voice signals from the speaking call participant.

16 Claims, 4 Drawing Sheets

MULTIMEDIA CONFERENCE CALL PARTICIPANT IDENTIFICATION SYSTEM AND METHOD

BACKGROUND OF THE INVENTION

This invention relates generally to telecommunications networks and, more particularly, to multimedia communications networks for providing multimedia service and the like including voice, video, image and/or data.

It is known in certain telecommunications systems to employ conferencing capabilities such that more than two callers or participants to a call may communicate with each other for the duration of the call. Additionally, certain multimedia telecommunications conference systems attempt to simulate face to face meetings of the call participants. Such conference systems permit separate meeting participants to communicate with one another in multiple media such as voice, video, image and/or data from their own calling location without requiring that they convene in the same place.

During a conference call in known multimedia telecommunications conference calling systems, it is generally problematic for participants of the call to follow the pace of the call especially in situations involving multi-site participants. It has been found that often times it is difficult and confusing for the participant to determine who is actually speaking during the conference call. Often this is the case when the individual participants to the call are not familiar with one another, e.g. a newly formed team for a company project. Therefore, there is a need in the art for coordinating the activities of the participants to a conference call including in the multimedia environment.

SUMMARY OF THE INVENTION

The problems noted above are solved in accordance with the present invention which provides a conference coordination system to coordinate the activities of a participant to a conference call. The inventive system and method further provides coordination of image, data and/or video of a speaker with the voice of the speaker to enable conference participants to relate to the voice with identification of the speaking participant.

In accordance with the present invention a method and system of identifying a call participant to a conference call having a plurality of call participants communicating via a telecommunication system is performed by detecting a presence of voice signals during the conference call and associating call participant identification information with the voice signals in response to the detection of the voice signals. A visual indication identifying a speaking call participant is established at at least one communication device to the conference call when the identified call participant speaks.

BRIEF DESCRIPTION OF THE DRAWINGS

The foregoing advantageous features of the invention will be explained in greater detail and others will be made apparent from the detailed description of the present invention which is given with reference to the several figures of the drawing, in which.

DETAILED DESCRIPTION

Figure 1:
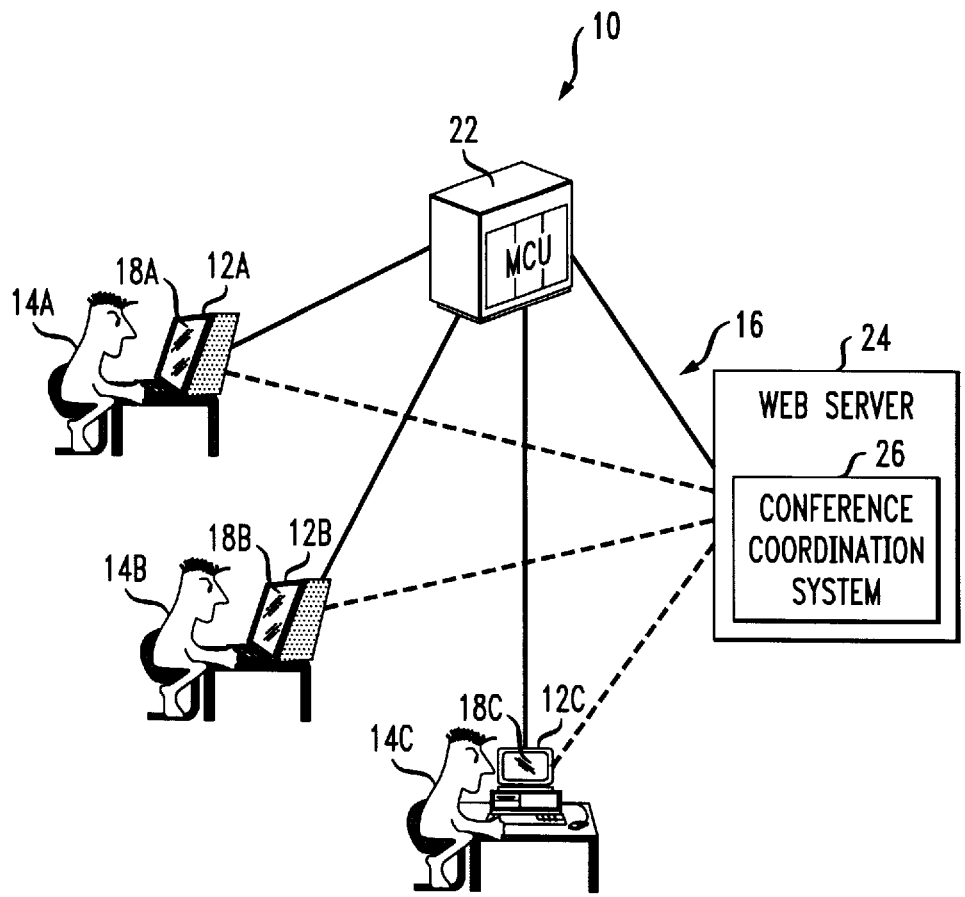
FIG. 1 is an illustrative diagram of the telecommunication system for identifying conference call speaking participants which the present invention may be practiced.

Referring to FIG. 1, telecommunication system 10 for establishing telephone conference calls between communication devices 12 at which call participants 14 interact with during a conference call is shown. It will be appreciated that the telecommunication system 10 may include a communications network (not shown) comprised of local or long distance telephone networks, or both, for the establishment of the telephone calls. During the conference call the call participant identification system 16 associates stored call participant identification information related to the speaking call participant 14A with voice signals which are detected as being received at the communication device 12A for the particular speaking call participant generating the voice signals. The call participant identification system 16 detects the presence of voice signals which are generated by a speaking call participant 14A and are received at the telephonic communication device 12A of the speaking participant. In response to the detection of these voice signals, the call participant identification system 16 associates stored call participant identification information for the speaking call participant 14A with the detected voice signals. The call participant identification information is broadly defined and may selectively be established in various forms such as coded information assigned to or associated with a particular call participant, text data representing the name of a call participant, or in the form of a media such as video or a digitized photographic image of a call participant.

A visual indication identifying the particular speaking call participant 14A is established at display devices 18B, 18C of the other communication devices 12B, 12C to the conference call in order to inform the other participants 14B, 14C to the call who the actual speaker is once that participant 14A speaks. The visual indication displayed at the display devices which are preferably terminal screens 18B, 18C of the communication devices 12B, 12C are preferably in the form of either: a real time video display of the speaking call participant, a photographic image of the call participant or text data identifying the call participant (such as highlighting the name of the speaking participant once the participant speaks). In particular, in response to the detected volume of voice signals being received from the speaking participant 14A at the associated communication device 12A, the visual indication identifying the speaking call participant is provided at the different communication devices 12B, 12C other than the one communication device 12A receiving the voice signals. The visual indication identifies the speaking participant to all the other participants to the conference call.

Preferably, the communication device 12 such as communication devices 12A, 12B, 12C of FIG. 1 are multimedia communication devices which are enabled to receive and transmit voice and data during a conference call. The multimedia communication devices 12A, 12B, 12C of FIG. 1 each have respective display devices or terminal screens 18A, 18B, 18C to display visual indications (preferably in the form of video or data displays) identifying the speaking call participant when he or she is speaking during the call. Many variations of multimedia communication devices capable of communicating telephonic voice signals, video and/or data information may selectively be employed. Examples of multimedia communication devices may include but are not limited to, personal computer with built in microphone for audio, workstation including an attached video camera and telephone (analog or ISDN telephone), personal computer with an integrated video camera and telephone and the like. For further details on the use and operation of multimedia communication devices and the operation of graphical multimedia communications for a conference call, reference can be made to U.S. Pat. No. 5,627,978 issued May 6, 1997 to Altom et al. entitled "Graphical User Interface for Multimedia Call Set-Up and Call Handling in a Virtual Conference on a Desktop Computer Conferencing System" which is hereby incorporated by reference in its entirety. Preferably, the multimedia communication devices or terminals employed are those which follow H.323 ITU standards for communication.

As seen in FIG. 1, the communication devices are coupled to a multipoint control unit (MCU) 22 for transmission and receipt of voice signals during the conference call. The MCU 22 has the capability of mixing, switching, and bridging voice/video/data. The multipoint control unit 22 is a bridging or switching device used in support of multipoint videoconferencing to support many conferencing locations. MCU 22 may selectively be in the form of customer premises equipment or embedded in a wide area network in support of carrier-based videoconferencing. As discussed above the presence of voice signals received from a speaking participant at a communication device 12A are detected. It will be appreciated that in a centralized call arrangement (i.e. the voice signals of all participants are mixed by the MCU 22) the digital signal processor (not shown) in the MCU 22 will detect the level of voice signals. Alternatively in a decentralized conference call each communication device 12 mixes the voice signals from all the participants in which a digital signal processor or central processor unit (not shown) at each communication device will detect voice signals.

A web server 24 in also seen coupled with the communication devices 12A, 12B, 12C for the receipt and transmission of data information. Conference coordination system (CCS) 26 is preferably provided at the web server 24 for coordinating the call participant identification information with the voice signals generated by the speaking call participant. The MCU 22 and CCS 26 at the web server 24 are also coupled in order to enable transmission of the visual information identifying the speaker to be allocated to appropriate other call participants during the conference call. Alternatively, the conference coordination system (CCS) 26 may selectively be implemented at the MCU 22. The CCS 26 is preferably programmed code implemented at a computer controlled device for coordinating the identification information of a call participant with the voice energy of the speaking call participant with the operation of the CCS discussed in further detail in FIGS. 3A–3B. The CCS 26 supports the required functions such as image storage and communications to achieve the coordination between voice activities and video/image/data. The CCS 26 is implemented at the web server 24 to support the communications with the communication devices 12A, 12B, 12C.

Figure 4:
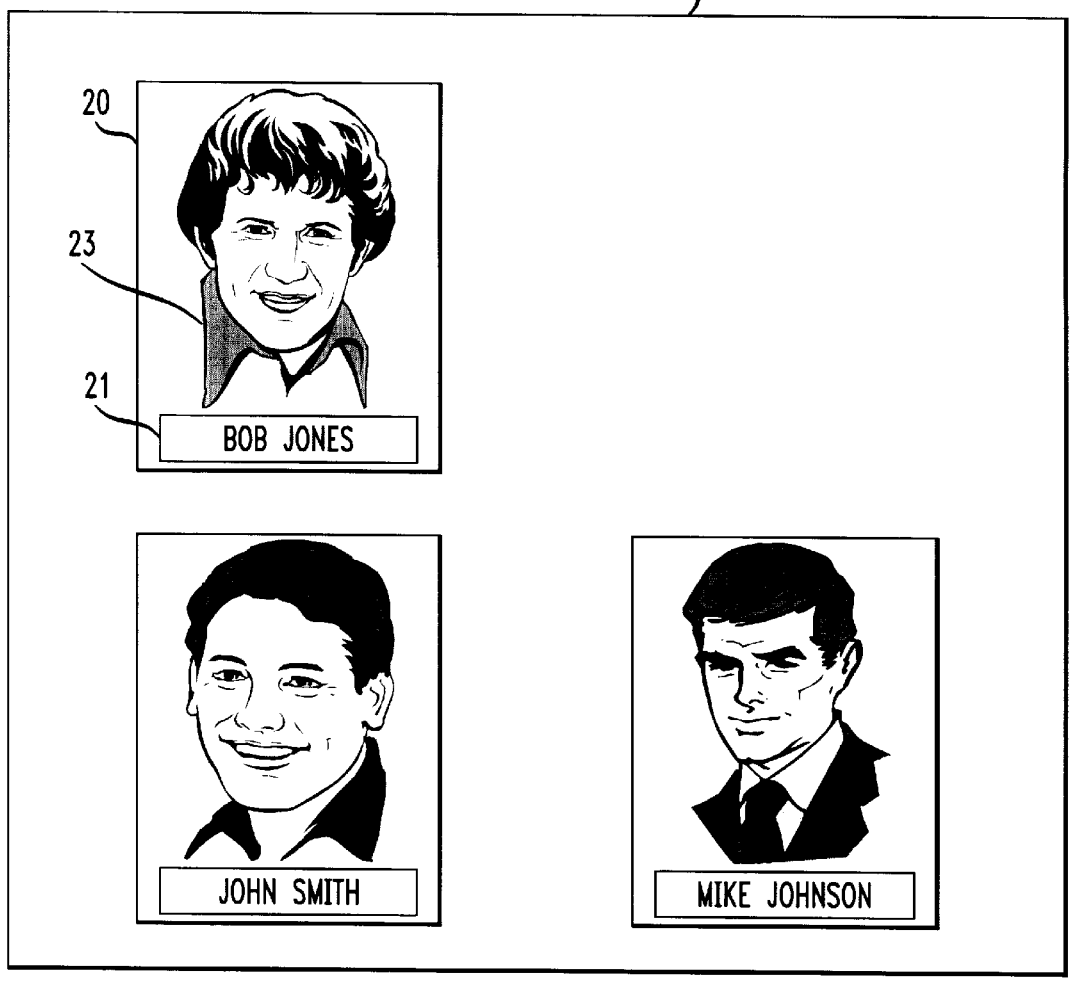
FIG. 4 is a graphical terminal, screen representation which identifies the speaking call participant in a multimedia conference call.

Referring to FIG. 4, a graphical screen representation at a display device 18 identifying the speaking call participant is shown. A visual indication 20 is provided at the display device 18 to inform the conference call participants who the speaking participant is when the identified call participant is speaking. The visual indication 20 may selectively be provided in many various forms. Data such as the name of the speaking participant 21 may selectively appear on the terminal screen 18 of the non-speaking participants or all the participants when one of the conference call participants is speaking. A video display or a photographic image 23 of the speaking call participant may selectively appear on the terminal screen 18 for the non-speaking conference call participants or all the call participants to identify the speaking participant during the conference call. Alternatively, the text data 21, video image or photographic image 23 associated with the speaking call participant which appears on the display device 18 may be illuminated or highlighted when the speaking call participant speaks. In the example seen in FIG. 4, the visual indication 20 of Bob Jones (either the text name 21, image 23 or both) is illuminated at communication devices 12B, 12C, FIG. 1, to inform the other participants 14B, 14C that Bob Jones at communication device 12A is the speaking call participant.

Referring again to FIG. 1, upon receipt of voice signals being received at a multimedia communications device 12A, and in turn the MCU 22, the volume of received voice signals are measured to determine if the volume exceeds a preselected threshold level. The preselected threshold level is preferably a level set for silence suppression. In the case of regular pulse code modulation (PCM) connections to the MCU 22, the multipoint processor 30, FIG. 2, determines if the volume of voice signals exceeds the preselected threshold level for silence suppression. The silence suppression level can be set by provisioning the MCU 22 or by channel-by-channel control at the MCU. In the case of packetized voice connection, the voice encoded by the terminal 12A–12C may selectively be provided with a silence indicator. For packetized voice situations, a digital signal processor preferably associated with either the computer controlled multimedia communication device 12A or the MCU 22 is enabled to detect the level of voice received and determine if the volume of voice meets the preselected level.

In response to the volume of voice signals received (from the speaking participant) at the communication device 12A exceeding the level set for silence suppression, the visual indication 20, FIG. 4, identifying the speaking call participant is established at the other communication devices 12B, 12C to the conference call. This provides the benefit of informing the other participants to the call who the speaker is when the identified participant is speaking during the conference call. If the measured voice signals fail to exceed the preselected threshold level, then the visual indication 20, FIG. 4, associated with the call participant is removed from the display devices 18B, 18C, FIG. 1, of the other conference call participants (at multimedia communication devices 12B, 12C). If the multimedia communication devices 12B, 12C have the capacity to perform the processing of the voice signals received, then the communication devices 12B, 12C themselves preferably detect the volume and perform highlighting and removal of the video channel. If the multimedia communication devices 12A, 12B, 12C do not have the capabilities to process the voice signals, then the MCU 22 alone or alternatively in conjunction with the CCS 26 highlights and removes the visual indication.

Figure 2:
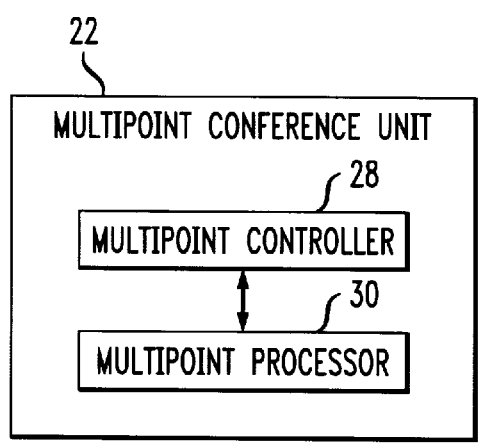
FIG. 2 is an illustrative functional block diagram of a multipoint conference unit.

Referring now to FIG. 2, the multipoint conference unit 22 is shown having multipoint controller 28 and multipoint processor 30. It will be appreciated that the multipoint control unit 22 allocates streams of video signals and voice signals between the communication devices associated with the conference call. The MCU 22 acts as a server for a conference call and further is a centralized resource acting as a mixer device for voice and video signals. For example, in a conference call which includes multimedia communication devices 12A, 12B and 12C, FIG. 1, the MCU 22 will combine the voice and video streams from devices 12B and 12C and send them to device 12A. The MCU 22 allocates voice from communication devices 12A and 12C to device 12B and so forth. The multipoint controller 28 controls the signaling and communication handshaking between the multimedia communication devices 12A, 12B, 12C participating in a conference call. The multipoint processor 30 controls the mixing of voice and video streams to the conferencing multimedia communication units. The multipoint processor (MP) 30 is an H.323 entity on a packet data network which provides for the centralized processing of audio, video, and/or data streams in a multipoint conference. The MP 30 provides for the mixing, switching, or other processing of media streams under the control of the multipoint controller 28. The MP 30 may process a simple media stream or multiple media streams depending on the type of conference supported.

Figure 3A:
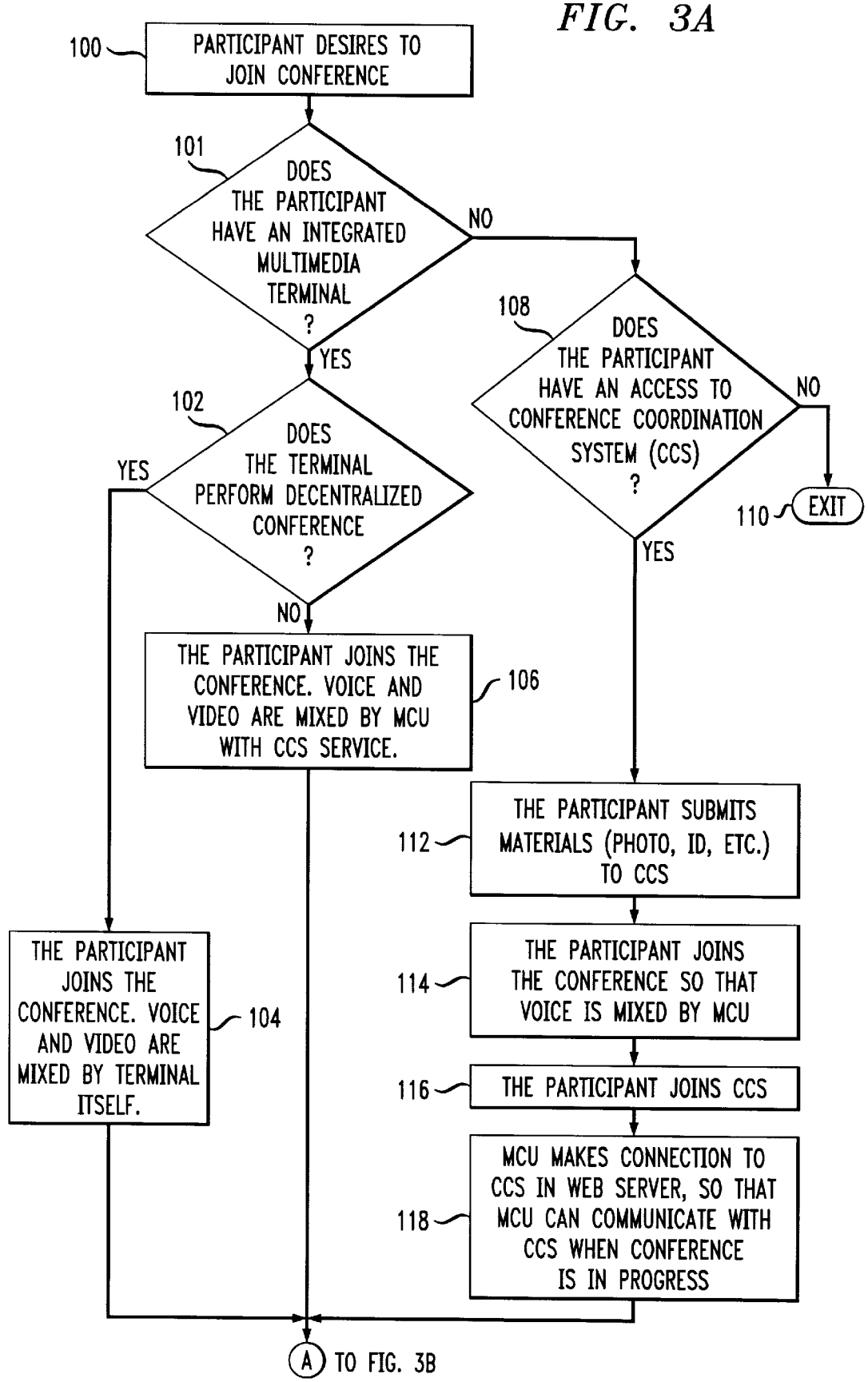
FIGS. 3A and 3B are flow charts illustrating the steps performed for coordinating call participant information in a multimedia conference call.
Figure 3B:
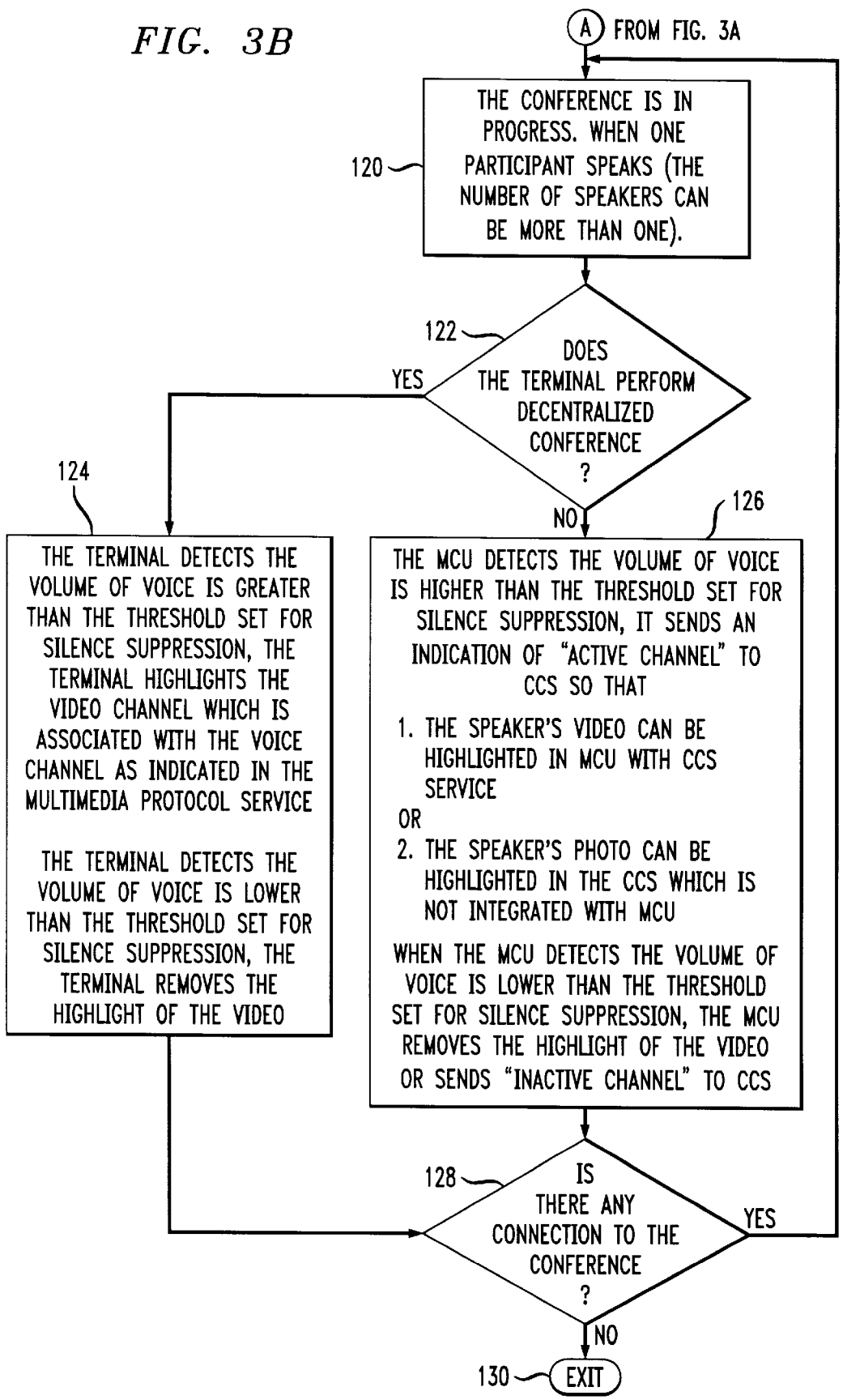

Referring now to FIGS. 3A–3B, the steps which are performed for coordinating speaker information for a multimedia conference call are shown. In step 100, FIG. 3A, a party participant 14A desires to join a conference call. In step 101, FIG. 3A, a determination is made to see if the communication device or terminal 12A at which the participant is stationed is an integrated multimedia terminal. If the terminal supports H.323, H.320 standard protocol and the like when the terminal is a multimedia terminal. An integrated multimedia communication device or terminal 12 is one which is capable of performing mixing of voice signals with associated data and video signals preferably in accordance with H.320, H.323, H.324, video conferencing standards and the like. If the participant has an integrated multimedia terminal 12A then in step 102, a check is made to determine if the terminal 12A performs decentralized conference.

Standard protocols support the determination of centralized or decentralized conference. Centralized conference refers to all media streams being mixed by a centralized device, such as MCU 22. Decentralized conference refers to individual terminals performing the media mixing function. If the integrated multimedia terminal 12A, FIG. 1, is capable of performing a decentralized conference then in step 104, FIG. 3A, the participant at the terminal 12A joins the conference. As seen in step 104, FIG. 3A, upon joining the conference, voice and video are mixed by the integrated multimedia terminal 12A. The processing then proceeds to step 120 for operation during the conference call. If the integrated multimedia terminal 12A, FIG. 1, does not perform decentralized conferences, then in step 106, FIG. 3A, the call participant at the terminal 12A joins the conference, however, the voice and video are mixed by the multipoint control unit (MCU) 22, FIG. 1, with conference coordination system (CCS) 26 service being part of MCU 22 and implemented at the multipoint controller 28, FIG. 2, and multipoint processor 30. The embodiment of the CCS 26 at web server 24 as seen in FIG. 2 is described in the paragraphs below. The functions of the CCS 26 in the MCU 22, FIG. 1, is similar to those in the multimedia devices 12A–12C of a decentralized conference. The processing then proceeds to step 120, FIG. 3A, for handling during the conference call.

If the participant does not have an integrated multimedia terminal 12A then the processing proceeds to step 108, FIG. 3A, to determine if the participant associated with the identified terminal has access to the conference coordination system (CCS) 26. If the participant does not have access to a conference coordination system 26, FIG. 1, the processing ends at step 110, FIG. 3A. If the participant at the terminal 12A has access to the CCS 26, then in step 112 the participant submits identification information or materials (such as a photograph of their likeness, video, their name, other identification information etc.) to the CCS 26. A storage device (such as a computer memory or other applicable conventional storage means) associated with the CCS stores the call participant identification information corresponding to a call participant. Alternatively, the call participant identification information may selectively be stored at a suitable storage device or memory of the multimedia communication device 12A. If the CCS 26 is integrated at a web server 24, then preferably a prompt is provided to the participant 14A at the terminal 12A asking if the participant plans to join the conference. When the participant confirms the desire to join the conference call, a prompt may selectively be issued requesting the participant to submit certain identification information (i.e. digitally stored photograph, video, participant's name, etc.) to be transmitted to the conference coordination system 26, FIG. 1. In step 114, FIG. 3A, the participant joins the conference with the received voice energy being mixed by the MCU 22, FIG. 1.

In step 116, FIG. 3A, the participant joins the CCS 26 and the identification information (i.e. digitally stored photo image) of the participant is accessed. In step 118, the MCU 22 makes a connection to the CCS 26 in the web server 24. The connection is made so that the MCU 22 can communicate with the CCS 26 when the conference is in progress.

Referring to FIG. 3B, in step 120 the conference call between the participating callers is in progress. The participants speak at their respective multimedia communication devices 12A, 12B, 12C and the number of speakers can be more than one. A test is preferably performed to determine which configuration the system 16 is running. In step 122, a determination is made concerning the ability of the terminals 12A–12C to perform a decentralized conference. The system 16 determines if certain terminals to the conference have the capability of processing received voice signals. If the communication device terminal 12A associated with the participant is enabled to perform a decentralized conference then in step 124, FIG. 3B, the terminal 12A detects when a volume of received voice energy is greater than the threshold set for silence suppression. Upon the detection of volume which exceeds the threshold, the terminal 12A, FIG. 1, highlights the video channel which is associated with the voice channel or indicated in the multimedia protocol service (such as H.323 and like multimedia protocols) as seen in step 124, FIG. 3B. If the terminal 12A detects a volume of voice signals, step 124 FIG. 3B, that is lower than the threshold set for silence suppression, then the terminal removes the highlight of the video channel. The highlighting may be implemented such that a banner (or additional banner) is superimposed on the video or a flashing caption is superimposed on the video. Flashing text may be implemented under (or proximate to) the video of the identified speaking participant.

If the terminal does not perform the decentralized conference then in step 126, FIG. 3B, the MCU 22 detects the volume of received voice. If the volume of voice is greater than the threshold set for silence suppression, then the MCU 22 sends an indication of active channel to the CCS 26. If the CCS 26, FIG. 1, is implemented at the MCU 22 then the video of the speaker (such as the photograph display of the speaker) is highlighted by the MCU in accordance with the directives of the CCS. If the CCS 26 is implemented at an Internet web server 24 the photo image or other identification information of the speaker may selectively be highlighted by the CCS 26. As seen in step 126, FIG. 3B, when the MCU 22, FIG. 1, detects a volume of voice that is lower than the threshold set for silence suppression, the MCU 22 will remove the highlight of the information identifying a speaker at the terminal. If the CCS 26 is at the web server 24, then if the measured volume does not meet the required threshold, the MCU 22 sends an "inactive channel" message to the CCS 26.

The processing then proceeds to step 128, FIG. 3B, to determine if any terminal is connected with the conference call. If a connection to the conference call remains then the processing returns to step 120, FIG. 3B, to monitor the conference in progress. The processing exits at step 130 if it is determined that there is no connection to the conference.

While a detailed description of the preferred embodiments of the invention has been given, it shall be appreciated that many variations can be made thereto without departing from the scope of the invention as set forth in the appended claims.

What is claimed is:

1. A method for identifying a call participant to a conference call having a plurality of call participants communicating via a telecommunication system, comprising the steps of:

detecting a presence of voice signals during the conference call; associating call participant identification information with the voice signals in response to the detection of the voice signals;

preselecting a threshold level for silence suppression;

measuring a volume of voice signals received at a communication device associated with the call participant generating the voice signals; and determining if the volume of voice signals exceeds the threshold level for silence suppression.

2. The method of claim 1 including the steps of storing call participant identification information associated with at least one call participant to the conference call, and coordinating the call participant identification information with the voice signals generated from the call participant.

3. The method of claim 2 including the step of enabling a visual indication identifying the call participant to be established at the communication device to the conference call in response to the detection of voice signals from the call participant.

4. The method of claim 3 in which the communication device is a multimedia communication device associated with another call participant to the conference call different from the call participant generating the detected voice signals.

5. The method of claim 4 including the step of coupling together a plurality of multimedia communication devices to the conference call in which the multimedia communication devices have a visual display for displaying call participant identification information.

6. The method of claim 5 in which the call participant identification information includes at least one of:

a) video of the call participant, b) photographic image of the call participant, and c) data identifying the call participant.

7. The method of claim 4 including the step of determining if the multimedia communication device is an integrated multimedia communication device capable of performing mixing of voice signals with associated data and video signals.

8. The method of claim 1 including the steps of providing a visual suppression of call participant identification information at a different multimedia communication device other than the communication device receiving the voice signals to identify at the different communication device the call participant generating the voice signals in response to the volume of voice signals exceeding the threshold for silence suppression.

9. The method of claim 8 including the step of removing the visual indication of call participant identification information at the different multimedia communication device in response to a determination that the volume of voice signals measured does not exceed the threshold level for silence suppression.

10. In a telecommunication system for establishing a conference call between a plurality of call participants communicating via multimedia communication devices, the improvement being a call participant identification system comprising:

means for detecting a presence of voice signals received at a multimedia communication device during the conference call;

a storage device for storing call participant identification information corresponding to a particular call participant of the conference call;

means responsive to the detection of voice signals during the conference call for associating the call participant identification information of the call participant generating the voice signals with the detected voice signal;

a multipoint control unit that measures a volume of voice signals received at the multimedia communication device; and means for determining if the volume of voice signals exceeds a preselected threshold level for silence suppression.

11. The telecommunication system of claim 10 including means for enabling a visual indication identifying the call participant generating the voice signals to be established at another multimedia communication device to the conference call.

12. The telecommunication system of claim 11 in which the visual indication includes at least one of:

a) video of the call participant;

b) photographic image of the call participant, c) data identifying the call participant.

13. The telecommunication system of claim 11 including a conference coordination system for coordinating the call participant identification information with the voice signals generated from the call participant.

14. The telecommunication system of claim 13 including a multipoint control unit coupled with the multimedia communication devices for mixing streams of voice signals from the plurality of multimedia communication devices.

15. The telecommunication system of claim 11 in which said visual indication at the other multimedia communication device identifying the call participant generating the voice signals is established in response to the volume of voice signals exceeding the preselected threshold level.

16. The telecommunication system of claim 15 including means for removing the visual indication identifying the call participant in response to the volume of measured voice signals failing to exceed the preselected threshold level.

* * * * *